(12) United States Patent
Grewal et al.

(10) Patent No.: US 11,924,245 B2
(45) Date of Patent: Mar. 5, 2024

(54) MESSAGE PHISHING DETECTION USING MACHINE LEARNING CHARACTERIZATION

(71) Applicant: Forcepoint, LLC, Austin, TX (US)

(72) Inventors: Dalwinderjeet Kular Grewal, Austin, TX (US); Kurt Natvig, Thatcham (GB)

(73) Assignee: Forcepoint LLC, Austin, TX (US)

( * ) Notice: Subject to any disclaimer, the term of this patent is extended or adjusted under 35 U.S.C. 154(b) by 558 days.

(21) Appl. No.: 17/137,674

(22) Filed: Dec. 30, 2020

(65) Prior Publication Data
US 2022/0210188 A1    Jun. 30, 2022

(51) Int. Cl.
*H04L 9/40* (2022.01)
*G06N 5/04* (2023.01)
*G06N 20/00* (2019.01)

(52) U.S. Cl.
CPC .......... *H04L 63/1483* (2013.01); *G06N 5/04* (2013.01); *G06N 20/00* (2019.01)

(58) Field of Classification Search
None
See application file for complete search history.

(56) References Cited

U.S. PATENT DOCUMENTS

2020/0053111 A1* 2/2020 Jakobsson ........... H04L 63/1416

OTHER PUBLICATIONS

Detecting Phishing Emails the Natural Language Way, 2012 (Year: 2012).*
R. Mohammad et al., "Phishing Websites Features," http://eprints.hud.ac.uk/id/eprint/24330/6/MohammadPhishing14July2015.pdf.
S. Aggarwal et al., "Identification and Detection of Phishing Emails Using Natural Language Processing Techniques," SIN '14: Proceedings of the 7th Int'l Conf. on Security of Information and Networks, pp. 217-222 (Sep. 2014).
R. Verma et al., "Detecting Phishing Emails the Natural Language Way," ESORICS 2012: Computer Security, pp. 824-841 (2012).
C. Falk, "Knowledge Modeling of Phishing Emails" (2016), Purdue University Open Access Dissertation.
Pedregosa et al., "Scikit-learn: Machine Learning in Python," JMLR 12, pp. 2825-2830 (2011).

* cited by examiner

*Primary Examiner* — Cai Y Chen
(74) *Attorney, Agent, or Firm* — Terrile, Cannatti & Chambers, LLP; Stephen A. Terrile

(57) ABSTRACT

An email phishing detection mechanism is provided that utilizes machine learning algorithms. The machine learning algorithms are trained on phishing and non-phishing features extracted from a variety of data sets. Embodiments extract embedded URL-based and email body text-based feature sets for training and testing the machine learning algorithms. Embodiments determine the presence of a phishing message through a combination of examining an embedded URL and the body text of the message for the learned feature sets.

20 Claims, 6 Drawing Sheets

MESSAGE PHISHING DETECTION USING MACHINE LEARNING CHARACTERIZATION

BACKGROUND

Field

This disclosure relates generally to computer system security, and more specifically, to a machine learning mechanism for characterization of phishing communications.

Related Art

Users interact, on a daily basis, with physical, system, data, and services resources of all kinds, as well as each other. Each of these interactions, whether accidental or intended, poses some degree of security risk, depending on the behavior of the user. External factors can influence user behavior to open systems and services to malicious attack.

Phishing attacks, for example, are social engineered attacks in which the attacker lures a victim to share sensitive information such as username, password, bank account number, address, Social Security number, and the like. Such attacks are carried out via emails, SMS messaging, and chat messages. Emails are typically the most common medium to execute phishing attacks. Attackers can urge their victims to click a link, fill in a form, or replied with sensitive information. When the victim clicks the link, the link takes them to a fraudulent site or installs malware on the user's browser or system designed to extract sensitive information. The phishing attacks can then lead to identity theft, loss of intellectual property or finances, or theft of secret information. According to one report, in a recent year, 32% of data breaches and 78% of cyber espionage, including installation and use of backdoors, involve phishing. The financial sector is the most frequent target of phishing attacks. In light of these issues, it is desirable to have an efficient mechanism to identify and quarantine phishing-related attacks on an enterprise network.

SUMMARY OF THE INVENTION

An email phishing detection mechanism is provided that utilizes machine learning algorithms. The machine learning algorithms are trained on phishing and non-phishing features extracted from a variety of data sets. Embodiments extract embedded URL-based and email body text-based feature sets for training and testing the machine learning algorithms. Embodiments determine the presence of a phishing message through a combination of examining an embedded URL and the body text of the message for the learned feature sets.

In one embodiment, an information handling system configured as an electronic mail server for an enterprise network is provided. The information handling system includes a processor, a network interface coupled to the processor and communicatively coupled to the enterprise network, and a first memory storing instructions executable by the processor. The instructions are configured to extract a uniform resource locator (URL) address embedded in an electronic mail (email) message received by the network interface, determine whether the extracted URL includes one or more features associated with a phishing URL, extract body text from the email message, determine whether the extracted body text includes one or more features associated with a phishing email message, and classify the email message as one of phishing or not phishing using the determinations associated with the extracted URL and the extracted body text.

In one aspect of the above embodiment, the one or more features associated with a phishing URL are predetermined by training a machine-learning URL classifier on one or more data sets including known phishing URLs and known non-phishing URLs. In a further aspect, the one or more features associated with the phishing URL include one or more of: use of shortening services on the URL; an IP address; a URL of greater than 75 characters; an "@" symbol within the URL; multiple sets of double slashes within the URL; a prefix or suffix separator by hyphen to a domain of the URL; one or more subdomains; and an "https" within the domain of the URL.

In another aspect of the above embodiment, the one or more features associated with the phishing email message are pre-determined by training a machine-learning body text classifier on one or more data sets including known phishing emails and known non-phishing emails. In a further aspect, the one or more features associated with the phishing email message include one or more of: a general greeting; a lack of richness in vocabulary; a lack of similarity between a subject of the email and the extracted body text; excessive use of pronoun references; and intent of the body text that is indicative of notification, urgency, action, consequence, and threat.

In yet another aspect of the above embodiment, the processor is configured to determine whether the extracted body text includes one or more features associated with the phishing email message by being further configured to perform natural language processing of the extracted body text to generate dependency and part-of-speech tags associated with sentences within the extracted body text, and use the tags to determine whether the extracted body text includes language constructs associated with an intent indicative of notification, urgency, action, consequence, and threat. In a further aspect, the processor is configured to determine whether the extracted body text includes the language constructs by being further configured to match the tags with language construct information stored in a second memory coupled to the processor in one or more dictionaries where the language construct information stored in the dictionaries is pre-determined during training of a machine-learning body text classifier on one or more data sets including known phishing emails and known non-phishing emails.

In another aspect of the above embodiment, the processor is configured to classify the email message as one of phishing or not phishing by being further configured to: classify the email message as a phishing message when both the extracted URL phishing determination and the extracted body text determination indicate the message is phishing; classify the email message as a phishing message when one of the extracted URL phishing determination or the extracted body text determination has a probability of being phishing above a set threshold; and, classify the email message is not a phishing message when neither of the extracted URL phishing determination or the extracted body text determination has a probability of being phishing above the set threshold.

In still another aspect of the above embodiment, the instructions executable by the processor are further configured to store the email message in a third memory and transmit a quarantine message to a recipient of the email message where the quarantine message includes a notification that the email message has been quarantined and information associated with the email message. In yet another aspect of the above embodiment, the determining of whether the extracted URL includes one or more features associated with a phishing URL and the determining of whether the extracted body text includes one or more features associated with a phishing email message are both performed by an associated machine-learning classifier.

Another embodiment provides a method for identifying phishing email messages. The method includes: receiving, at a network interface coupled to an enterprise network, an email message; extracting a URL address embedded in the email message; determining whether the extracted URL includes one or more features associated with a phishing URL; extracting body text from the email message; determining whether the extracted body text includes one or more features associated with a phishing email message; and, classifying the email message as one of phishing or not phishing using the determinations associated with the extracted URL and the extracted body text.

In one aspect of the above embodiment, the one or more features associated with a phishing URL are pre-determined by training a machine-learning URL classifier on one or more data sets including known phishing URLs and known non-phishing URLs. In a further aspect, the one or more features associated with a phishing URL include one or more of: use of shortening services on the URL; an IP address; a URL of greater than 75 characters; an "@" symbol within the URL; multiple sets of double slashes within the URL; a prefix or suffix separator by hyphen to a domain of the URL; one or more subdomains; and an "https" within the domain of the URL.

In another aspect of the above embodiment, the one or more features associated with a phishing email message are pre-determined by training a machine-learning body text classifier on one or more data sets including known phishing emails and known non-phishing emails. In a further aspect, the one or more features associated with the phishing email message include one or more of: a general greeting; a lack of richness in vocabulary; a lack of similarity between a subject of the email and the extracted body text; excessive use of pronoun references; and intent of the body text that is indicative of notification, urgency, action, consequence, and threat.

In another aspect of the above embodiment, said determining whether the extracted body text includes one or more features associated with the phishing email message further include performing natural language processing of the extracted body text to generate dependency and part-of-speech tags associated with sentences within the extracted body text, and determining whether the extracted body text includes language constructs associated with an intent indicative of notification, urgency, action, consequence, and threat, using the tags associated with the sentences. In a further aspect, said determining whether the extracted body text includes the language constructs further includes matching the tags with language construct information stored in a second memory coupled to the processor in one or more dictionaries where the language construct information stored in the dictionaries is predetermined during training of a machine-learning body text classifier on one or more data sets including known phishing emails and known non-phishing emails.

In yet another aspect of the above embodiment, said classifying the email message as one of phishing or not phishing further includes: classify the email message is a phishing message when both the extracted URL phishing determination and the extracted body text determination indicate the message is phishing; classify the email message as a phishing message 11 of the extracted URL phishing determination or the extracted body text or termination as a probability of being phishing above a set threshold; and, classify the email message that is not a phishing message when neither of the extracted URL phishing determination or the extracted body text determination has a probability of being phishing above the set threshold. In yet another aspect, the method further includes storing the email message in a third memory and transmitting a quarantine message to a recipient of the email message using the network interface where the quarantine message includes a notification that the email message has been quarantined and information associated with the email message.

Another embodiment provides an information handling system configured to examine communications incoming to an enterprise network for phishing communications. The information handling system includes: a processor; a network interface, coupled to the processor, and communicatively coupled to the enterprise network; a first memory storing instructions executable by the processor. The instructions are configured to extract a URL address embedded in an incoming communication message received by the network interface, determine whether the extracted URL includes one or more features associated with the phishing URL, extracted body text from the incoming communications message, determine whether the extracted body text includes one or more features associated with phishing communication, and classify the incoming communication message as one of phishing or not phishing using the determinations associated with the extracted URL and the extracted body text.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide an email phishing detection mechanism that utilizes machine learning algorithms. The machine learning algorithms are trained on phishing and non-phishing features extracted from a variety of data sets. Embodiments extract embedded URL-based and email body text-based feature sets for training and testing the machine learning algorithms.

Phishing emails are unwanted emails that are engineered in a way to trick a user's brain into opening and acting on them. One study has shown that 1 in 10 people open an email attachment when they have no idea what the attachment relates to, and about half of phishing victims open an attachment or click a URL link within less than an hour of the phishing campaign launch, or a phishing email reaching an inbox.

Phishing emails are dynamic—changing every quarter or every season (e.g., tax season and holiday seasons). In order to react to the changing nature of phishing emails, a machine learning approach can be more flexible and able to react to catch and block phishing emails as their character changes. Traditionally a static, rule-based email detection has been used, which makes no differentiation between spam and phishing. Traditional approaches treat spam and phishing the same, which can miss an average of 1-2% of phishing emails.

During the development of embodiments of the present invention, a common pattern in phishing emails was discovered. This pattern illustrates that a phishing attacker informs the user that some activity has happened (e.g., a quota limit exceeded, unusual activity detected on an account, and the like) followed by an action and a consequence that the user has to take or perform (e.g., revalidate by clicking on a link, send back sensitive information, and the like), and followed by a threat that the user should avoid (e.g., your account will be deactivated or closed, or you won't be able to send or receive new emails, and the like).

These phishing emails are further crafted in a manner that pushes a user to click on a URL link or do as directed in the email. Additionally, the emails can have a link to a malicious site. These malicious sites may be only a few hours old, or the address may redirect to a different domain, or there may be an "https" buried in the domain name.

Embodiments of the present invention provide a mechanism to identify the combination of characteristics of a phishing email: (1) body text of the email (e.g., inform, action, consequence, and threat), and (2) URL (domain age, domain registration, IP number within the URL, and the like). This identification mechanism is a machine learning algorithm that provides a powerful email phishing detection tool.

Figure 1:
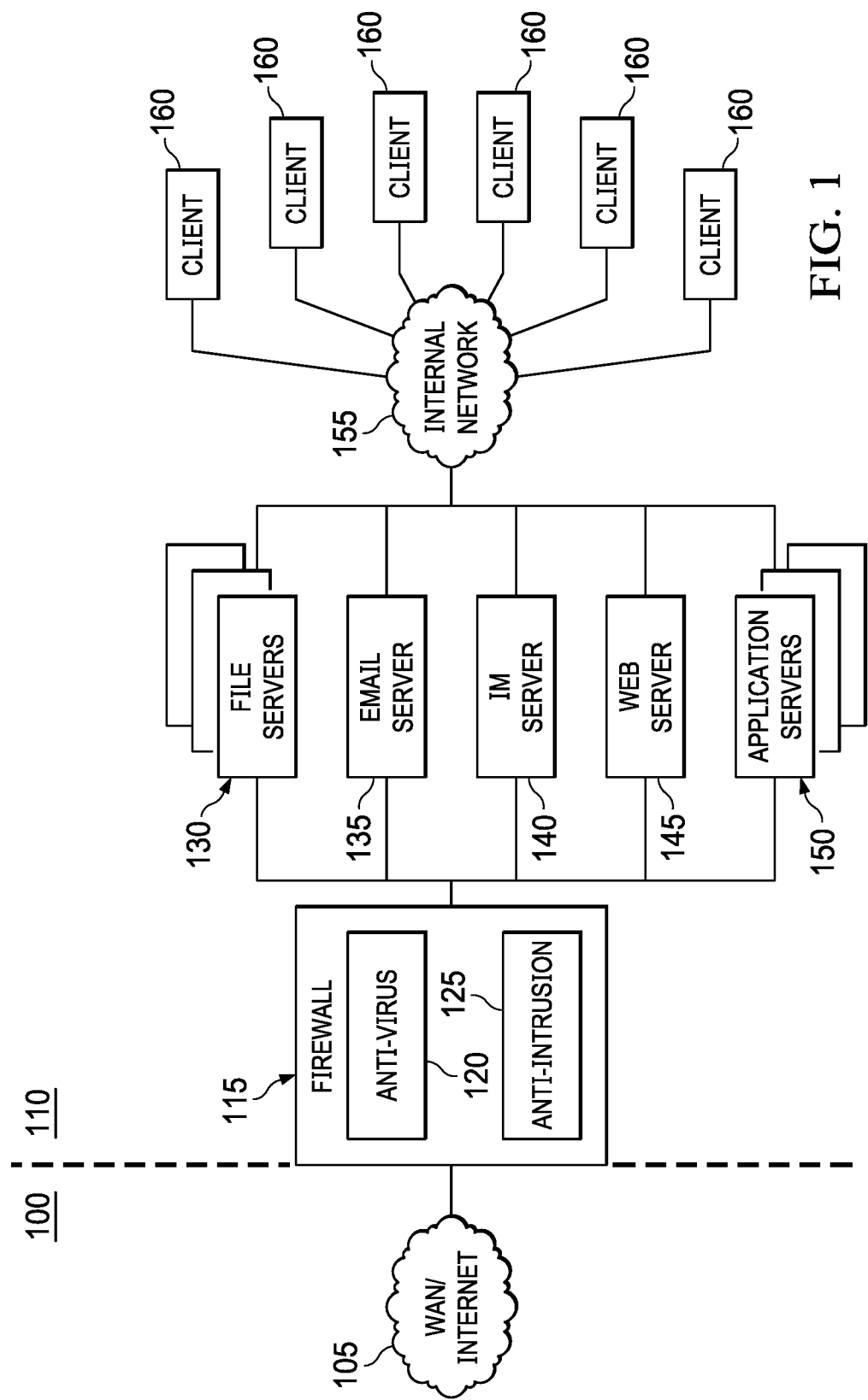
FIG. 1 is a simplified block diagram illustrating a network environment incorporating an email server configurable to implement phishing characterization of emails in accordance with embodiments of the present invention.

FIG. 1 is a simplified block diagram illustrating a network environment 100 incorporating an email server configurable to implement phishing characterization of emails in accordance with embodiments of the present invention. A wide area network 105 is a source of incoming communications to an enterprise network 110. The incoming communications can include, for example, electronic mail, website communications, messaging, file data, and application data. A firewall 115 separates wide area network 105 from enterprise network 110, providing communications filtering such as antivirus filtering 120 and anti-intrusion filtering 125. Firewall 115 can be implemented by a variety of network nodes, including, for example, a router or a bridge configured to implement filtering and router protocols.

Within enterprise network 110 there can be a variety of network connected servers, providing data services to users both internal and external to the enterprise network. Examples of network-connected servers can include, for example, file servers 130, email server 135, instant messaging server 140, web server 145, and application servers 150. Each of these network-connected servers is configured to provide clients access to one or more applications and associated data via one or both of an internal network 155 of the enterprise or wide area network 105. Internal network 155 couples the various network connected servers to clients 160.

The network connected servers and clients each can be provided by one or more information handling systems coupled to the networks. In addition to the information handling systems configured as network nodes within the enterprise network, the environment can include cloud-based systems that are nodes on networks external to the enterprise network but serving data for which access is desired to be controlled.

Figure 2:
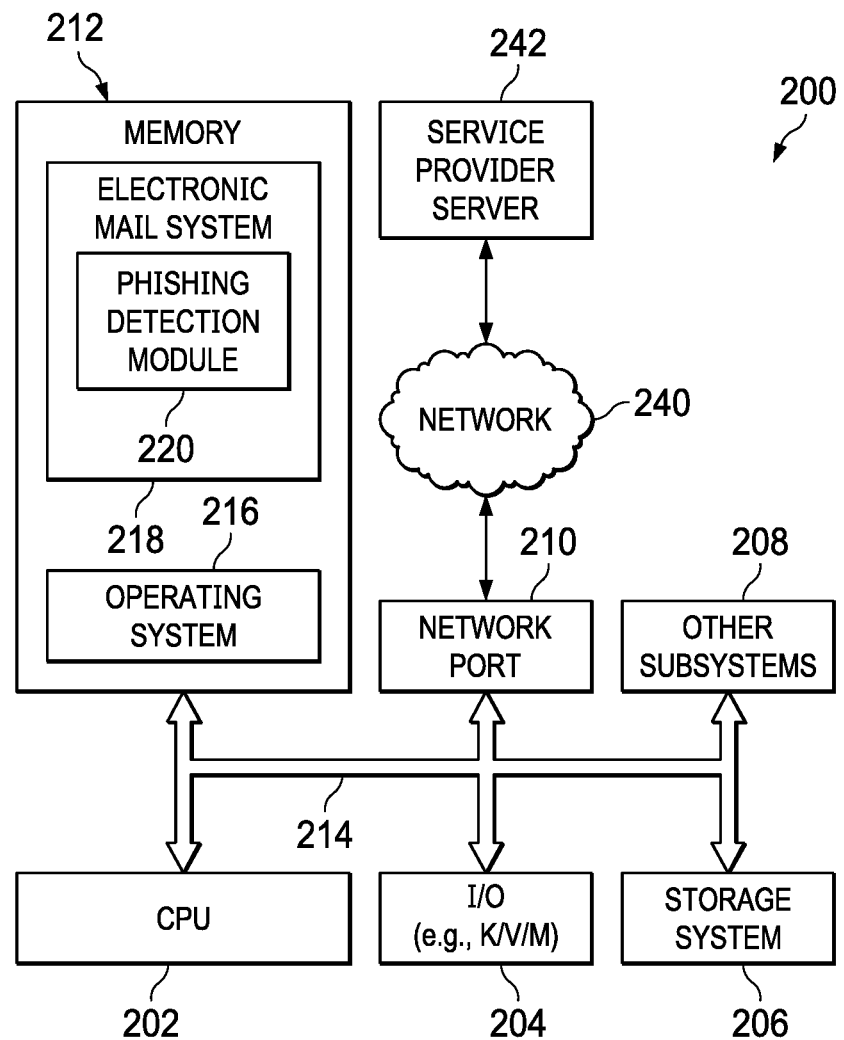
FIG. 2 is a generalized illustration of an information handling system that can be used to implement the system and method of the present invention.

FIG. 2 is a generalized illustration of an information handling system 200 that can be used to implement the systems and methods associated with the present invention. Information handling system 200 includes a processor (e.g., central processor unit or "CPU") 202, input/output (I/O) devices 204, such as a display, a keyboard, a gesture input device, and associated controllers, a storage system 206, and various other subsystems 208. In various embodiments, the information handling system 200 also includes network port 210 operable to connect to a network 240, which is likewise accessible by a service provider server 242. The information handling system 200 likewise includes system memory 212, which is interconnected to the foregoing via one or more buses 214. System memory 212 further includes operating system (OS) 216 and in various embodiments may also include an electronic mail system 218. In one embodiment, the information handling system 200 is able to download the electronic mail system 218 from the service provider server 242. In another embodiment, electronic mail system 218 is provided as a service from the service provider server 242.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a gesture input device (e.g., mouse, trackball, trackpad, touchscreen, and touch sensitive display device), a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

In various embodiments, electronic mail system 218 performs operations associated with email reception, filtering/analysis, and delivery. As will be appreciated, once information handling system 200 is configured to perform the electronic mail operations, the information handling system becomes a specialized computing device specifically configured to perform electronic mail operations and is not a general-purpose computing device. Moreover, the implementation of electronic mail system 218 on the information handling system 200 improves the functionality of the information handling system 200 and provides a useful and concrete result of performing electronic mail functions and functions associated with phishing detection module 220 to mitigate security risk. In embodiments of the present invention, electronic mail system 218 is implemented to include a phishing detection module 220. In certain embodiments, phishing detection module 220 may be implemented to perform the various phishing detection operations described in greater detail herein. It should be noted that embodiments are not limited to detecting phishing communications within an electronic mail message but can also detect phishing in other incoming communication vectors to an enterprise network, such as, for example, instant messaging, texts, and the like. The phishing detection modules discussed herein can be included as a part of a server managing these types of incoming communication vectors.

Figure 3:
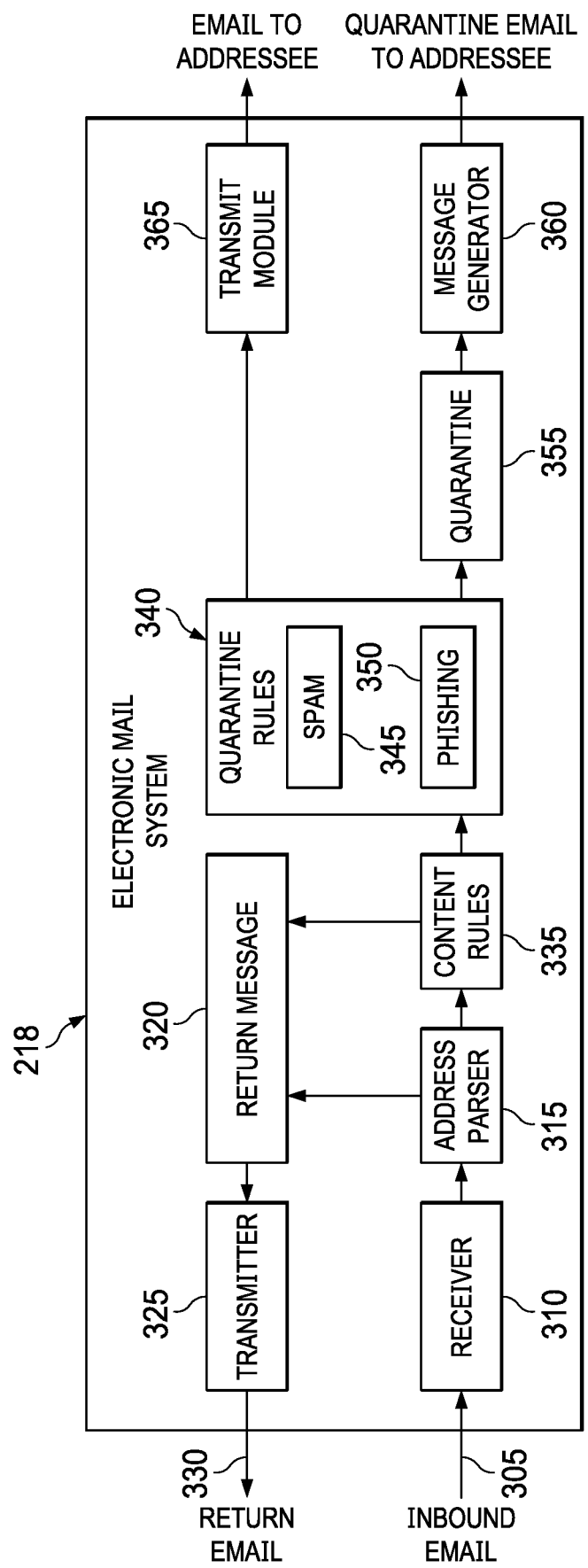
FIG. 3 is a simplified functional block diagram illustrating an example electronic mail system information handling system configured in accordance with embodiments of the present invention.

FIG. 3 is a simplified functional block diagram illustrating an example electronic mail system 218 information handling system configured in accordance with embodiments of the present invention. Inbound email 305 is received by electronic mail system 218 at receiver module 310. Upon reception of an incoming email, an address parser 315 can examine the intended recipient address to determine whether such an address is served by the electronic mail system. If no such address is served by the electronic mail system, then return message module 320 can generate a return message for the sender of the original incoming email and provide that to transmitter module 325 which can, in turn, provide return email 330 to the network. If the incoming email passes the address parser testing, the message can be provided to a content rules module 335 that can determine whether the email and attachments thereto conform to basic rules of the enterprise network for delivery (e.g., size, data protocol, and the like). As with the address parser, if the incoming electronic mail does not conform to the content rules, a return message can be generated by return message module 320.

If the incoming electronic mail passes tests of both the address parser and content rules, the electronic mail can be provided to a quarantine rules module 340. Quarantine rules module 340 performs a variety of content analyses of the incoming electronic mail to determine whether the content is potentially harmful (e.g. phishing) or spam type messaging, for example. A spam filtering module 345 and a phishing characterization module 350 can be provided within quarantine rules module 342 perform the characterization and filtering analyses. Should an electronic mail message not clear the spam or phishing filters, the message can be stored by a quarantine module 355 and a message, informing the recipient that a quarantined electronic mail has been received, can be generated by a message generator 360. If the electronic mail message clears the various quarantine filters, then the email can be provided to the addressee via transmit module 365.

Figure 4:
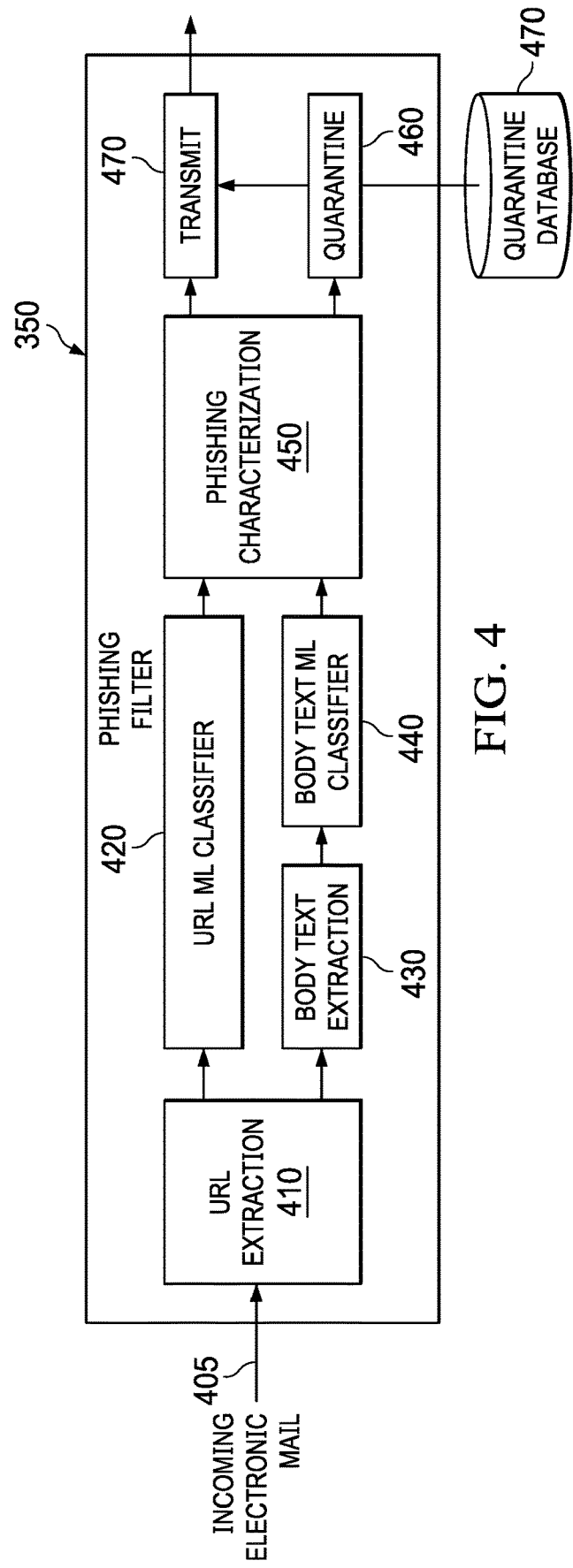
FIG. 4 is a simplified functional block diagram illustrating an example of a phishing filter module configured in accordance with embodiments of the present invention.

FIG. 4 is a simplified functional block diagram illustrating an example of a phishing filter module 350 configured in accordance with embodiments of the present invention. As discussed above, it was discovered that a common pattern in phishing emails exists in both the body text of the phishing email and in embedded URL links provided in the email toward which a user is encouraged to click. Phishing filter 350 is configured to perform analysis of both the URL and the body text. Specifically, a classification is performed using a trained machine learning classifier for each of the URL and body text.

An incoming email 405 is first provided to a module that performs extraction of an embedded URL 410, should there be such a URL. The URL extraction module examines the email for a clickable link and provides that URL to a URL machine learning classifier 420. As will be discussed in greater detail below, URL machine learning classifier 420 examines the extracted URL for characteristics associated with the types of links commonly found in phishing emails. These characteristics are trained into the machine learning classifier using data sets of known phishing emails and URLs known to be malicious. To classify a link in an email as malicious, URL-based features typically fall into the following three categories: address bar, domain, and website. The combination of these features enables the ability to distinguish friend phishing and legitimate sites.

In addition to URL extraction, the email is subjected to a body text extraction by a body text extraction module 430. The extracted body text is provided to a trained body text machine learning classifier 440. Again, as will be discussed in greater detail below, body text machine learning classifier 440 examines the extracted body text for characteristics associated with types of text commonly found within phishing emails. The body text of a phishing email typically contains a unique and repetitive pattern pushing or urging a victim to click on a link or send personal information.

Classification of an embedded URL link along with the body text of the email are performed to provide a quantitative value for the probability of the URL and body text being related to phishing. The probability values can then be provided to a phishing characterization module 450 that can combine the classifications using multiple if-else statements to determine whether that combination is indicative of a phishing email or meets or exceeds a threshold suggesting a phishing email. Should the determination be that the email is phishing related, then the phishing email can be quarantined by quarantine module 460. Quarantine module 460 can save the offending email in a quarantine database 470 and then transmit an informational message to the recipient indicating that the offending email has been quarantined and providing sufficient information for the recipient to identify the email. Should the email not be determined to be phishing, then the email can be provided to the recipient via a transmission module 470.

To train a machine learning classifier, features were extracted from URLs and email bodies. These features were identified from various literature and research on the email body itself. As discussed above, two types of feature sets, URL and email body, were used to detect phishing emails with or without a malicious link. The two types of feature sets or combinations thereof are effective in detecting phishing and legitimate emails.

Embodiments utilize a Random Forest supervised learning model to do email classification. Random Forest is a group of multiple decision trees. The trees are trained on a random subset of the training data. For classification, the Random Forest model votes on the output of all the decision trees to make a final prediction. During evaluation, Random Forest had better accuracy compared to other classifiers, such as decision trees and logic regression.

To train the Random Forest classifier requires labeled data, for both phishing and legitimate URLs and email bodies. The URL classifier was trained using a large set of known phishing URLs and a corresponding large set of known legitimate URLs. The body text classifier was similarly trained using a large set of known phishing emails and a large set of known legitimate emails.

In order to accurately train the Random Forest, the datasets were cleaned to ensure that only accurate phishing-related information was present. For example, one original body text data set was a collection of phishing and spam emails. To build a robust phishing classifier, the classifier needed to be trained only on a phishing data set that did not include spam emails.

Spam and phishing emails have different purpose, approach, and text content. To remove spam from the body text data set, a Latent Dirichlet Allocation (LDA) topic modelling technique was employed. LDA describes a document as a mixture of a small number of topics and that each word's presence is attributable to one of the document's topics. LDA thereby can discover the topics that best describe a set of documents.

Figure 5:
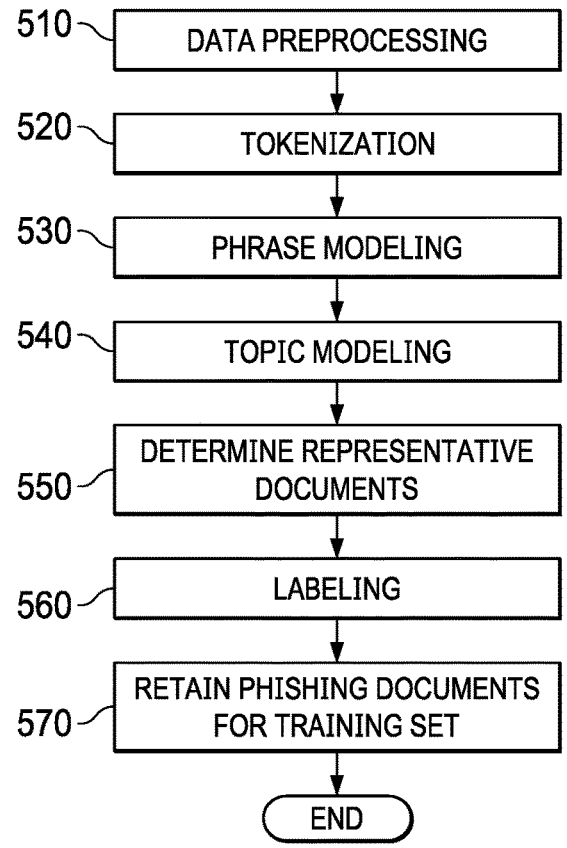
FIG. 5 is a simplified flow diagram illustrating steps performed for topic discovery using Latent Dirichlet Allocation.

FIG. 5 is a simplified flow diagram illustrating steps performed for topic discovery using LDA. Initially, data preprocessing (510) is performed. Such pre-processing includes, for example, removing stopwords and performing lemmatization. Stopwords include words such as, for example, "is," "the," "am," and "an." Lemmatization involves replacing a word with its root word (e.g., "connection" replaced with "connect"). Once data pre-processing is performed, then a tokenization process (520) is performed, which converts sentences in the body text to individual words. Phrase modeling (530) is also performed. Bigrams were used for one embodiment of phrase modeling. An N-gram is a sequence of N words. Thus, a bigram is a two-word sequence of words such as "please turn," "turn your," "New York," "suspicious activity," and "your account."

Topic modeling (540) is then performed. During topic modeling, a unique identifier is assigned to each word to form a document vocabulary. Then each document in the dataset is converted into a corpus format that reflects word identifiers and the frequency of each word in the document. The LDA model then receives the document vocabulary and corpus to generate topics, as discussed above. In one embodiment, the number of topics is specified in advance and a list of topics generated. A representative document is determined (550) for each topic. This can aid in determining the nature of the topic. In the instance of the body text dataset, this allows for differentiation between phishing and spam emails. Labeling (560) is then performed to indicate the most dominant topic associated with each document in the dataset, thereby assigning a topic to every document. Documents are then sorted according to their labels to retain the documents with topics associated with phishing emails for the training dataset (570).

An example of topics, with the top 10 words associated with the topic, and a label (e.g., spam/phish) are provided in Table 1 below.

TABLE 1

| Topic | Top 10 words | Label |
|---|---|---|
| 0 | face, company, account, key, meet, include, email, logistic, day, business | Phish |
| 1 | payment, united, compensation, nation, contact, fund, delivery, address, email, card | Phish |
| 2 | card, atm, delivery, contact, address, payment, bank, company, pay, visa | Phish |
| 3 | bank, fund, account, payment, transfer, receive, state, federal, address, united | Phish |
| 4 | money, fund, business, bank, late, know, help, good, contact want" | Phish |
| 5 | good, regard, life, change, happen, world, believe, think, time, positive" | Spam |
| 6 | email, claim, lottery, win, number, winner, address, prize, reply, draw | Phish |
| 7 | fund email, receive, contact, information, money, send, address, mr, number | Phish |
| 8 | fund, payment, Nigeria, address, receive, office, money, western union, information, know | Phish |
| 9 | fund, usd, email, help, money, know, information, charity, mr, world | Phish |
| 10 | consignment, box, address, united, state, airport, email, international, delivery, detail | Phish |
| 11 | de, important, com, org, nz, net, info, uk, co, font | Spam |
| 12 | Account, email, mail, click, service, message, information, mailbox, update, customer | Phish |

The LDA algorithm was trained on a data set of approximately 22,000 phishing and spam emails. The trained LDA model was used to predict the most likely topic for each email in the data set. When a topic subsequently was manually identified as spam, emails associated with that topic were discarded from the data set.

Once the data set for training body text classifier and the URL classifier had been subject to data cleaning, features were extracted from the phishing email body texts and the URLs. Additional pre-processing was performed on the email body text data set to check the emails for data content and language, for example. With regard to data content, the body text of an email required more than five words within the email for valuable extraction. In addition, the training dataset was restricted to one language. In one embodiment, the training dataset was restricted to English. Any non-English language emails were rejected from the dataset for feature extraction.

The URL and body text classifiers were trained on 85% of the feature data set and the remaining 15% of the data sets were used to compute the classifiers accuracy. Decision tree, logistic regression, and random for us classifiers were compared before determining that a Random Forest classifier perform better than both the alternative classifiers relating to accuracy (e.g., (True Positives+True Negatives)/N), precision (e.g., True Positives/(True Positives+False Positives)), and recall (e.g., True Positives/(True Positives+False Negatives)) score.

As discussed above with regard to FIG. 4, the classifications generated by URL machine learning classifier 420 and body text machine learning classifier 440 are combined during phishing characterization 450. In one embodiment, the URL and email Random Forest classifiers are merged using multiple if-else statements. For example, if both the classifiers predict a test case as positive, then the prediction is that the instant email is phishing (a true positive). If the predictions from the classifiers do not match, then the characterization is based on the probability from the classifiers. If the probability of being phishing is higher for either classifier than a set threshold (e.g., probability greater than 60%), then the instant email is labeled as phishing else legitimate.

During body text training, a common pattern in the language of phishing emails was discovered. In the pattern of a typical phishing email, an attacker informs the user that some activity has happened, followed by an action and consequences that user has to take or perform, followed by a threat that the user should avoid. An example phishing email contained the following text:

Your mailbox has exceeded the storage limit which was set by your administrator, you may not be able to send or receive new mail until you revalidate your mailbox. To revalidate your mailbox, please send the following details below:

[Request for name, username, password, email address, and phone number]

If you fail to revalidate your mailbox, your mailbox will be deactivated!!!

Deciphering the above phishing email with regard to the determined pattern of phishing emails reveals the following:

Inform: your mailbox has exceeded the storage limit which was set by your administrator Action: to revalidate your mailbox please send the following details below Threat: if you fail to revalidate your mailbox your mailbox will be deactivated!!!

Consequence: you may not be able to send or receive new email until you revalidate your mailbox.

In addition to the above, an intent sequence is also common in many phishing emails. That is, the attacker unveils their intent in a certain sequence and the sequence is another feature that helps in distinguishing between phishing and legitimate emails. The observed sequences include, for example: inform, consequence, action, threat, consequence; inform, consequence, action, threat; and inform, consequence, action.

Further, typical phishing emails have an excessive use of pronoun terms such as "you," "your," "our," and "we." A typical phishing attacker uses words such as "you" and "your" to trigger a panic response and make it personal for the reader of the phishing email (e.g., "this is to inform you that suspicious activity is observed on your account.").

In order to develop a robust email classifier, embodiments are configured to extract information associated with the intention information discussed above. With regard to the "inform" characteristic, text is identified with regard to who the attacker is informing and about what the attacker is informing. With regard to the "action" characteristic, text is identified regarding what action the attacker is asking a user to perform, who must perform the action, and what entity the action is intended for. With regard to the "consequence" and "threat" characteristics, text is identified regarding what the consequence and required action for the consequence is, who will be affected by the consequence, and what will be the consequence if the threat is ignored. Finally, with regard to the "urgency" characteristic, text is identified regarding whether there is an urgency or convincing tone, and if there is an urgency what is the action associated with that urgency.

Figure 6:
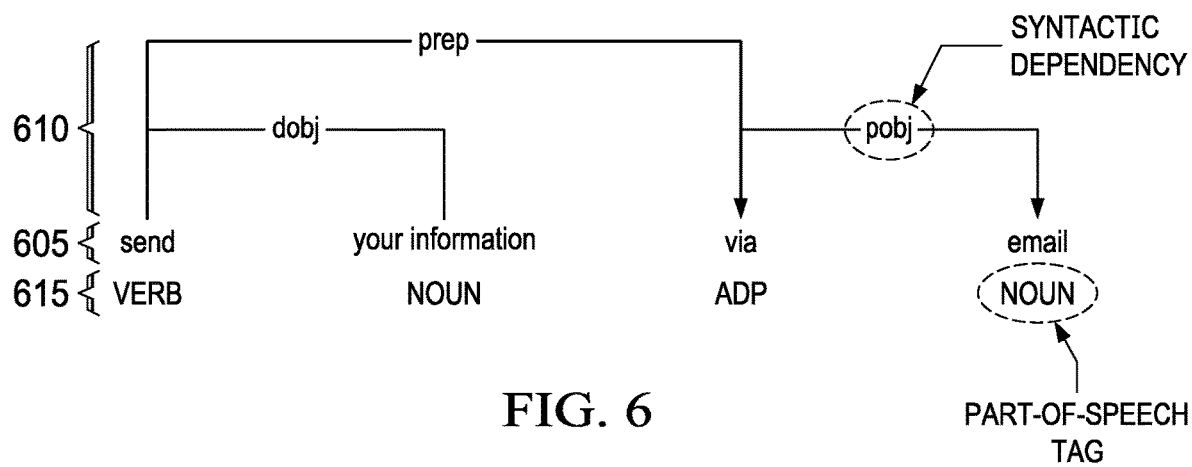
FIG. 6 is a diagram illustrating concepts associated with natural language processing, utilized by embodiments of the present invention.

FIG. 6 is a diagram illustrating concepts associated with natural language processing, utilized by embodiments of the present invention. To extract the above features, natural language processing (NLP) techniques, such as dependency parsing and part-of-speech (POS) tagging, are used. FIG. 6 illustrates a set of dependency tags 610 for a sentence 605 and a set of POS tags 615 for that sentence. Along with the dependency tags 610, are a set of connectors representing the syntactic dependencies or relationships between the words in sentence 605. Each connector has a head and a dependent word (e.g., for the portion of the sentence "send your information," "send" is the head and "your information" is the dependent.

Dependency parsing describes the relationship between a head word and its dependencies, and the relationship is written in lowercase in FIG. 6. POS tagging assigns tags to the words within a sentence, like noun or verb, which are written in uppercase in FIG. 6. Using dependency parsing and POS tagging techniques, the most frequently used words to convey intentions were identified during training. These words facilitate the creation of multiple dictionaries which help in collecting features for training the Random Forest email body text classifier. Dependency parser keywords found to be most useful in the formation of the dictionaries included adverbial clause modifiers (advcl), adverbial modifiers (advmod), direct objects (dobj), and nominal subjects (nsubj). POS tags found to be most useful in formation of the dictionaries included, for example, verbs and nouns. In addition, the grammar structure of the text (e.g., left and right children of the keywords) was used to help in identifying whether an attacker was conveying information or asking a user to take an action.

As one example of creation of the Inform characteristic dictionary, nominal subject (nsubj) and verbs (VERB) dependency and POS tagging keywords are required. A dictionary was created associated with "informing about what?" This dictionary contains dependent words of the nominal subject dependency tag (e.g., mailbox, account, storage, and password). Another dictionary was created associated with informing the user about an event or activity that has happened and what that event is. This dictionary contains head and dependent word pairs of nominal subject dependency tag and the dependent's left child and must meet the following conditions: the left child is a NOUN word where the NOUN word can only be you, your, our, or we, and the words are in the same sentence (e.g., "your mailbox has exceeded the storage limit.").

As an example of creation of an Action characteristic dictionary, direct object (dobj), verbs (VERB), and nouns (NOUN) dependency and POS tagging keywords are required. A dictionary is created associated with "what action an attacker is asking a user to perform." This dictionary contains head words of direct object (dobj) syntactic dependency tag, where a head word is a verb (VERB) (e.g., click, send, update, upgrade, confirm, and the like). Further, an action related information dictionary is generated, such as on what entity, whose entity is that, and who must perform the action. This dictionary contains head and dependent word pairs of direct object (dobj) dependency tag and a left child of the dependent, where the head word is a verb (VERB) and the left child of the dependent is a noun (NOUN). In addition, the noun can only be "you" or "your" with the words in the same sentence (e.g., "for your security we need you to validate this change to your account").

As an example of creation of an Urgency characteristic dictionary, adverbial modifiers (advmod) and verbs (VERB) dependency and POS tagging keywords are used. One dictionary is generated associated with whether there is an urgency or convincing tone detected in the email. This dictionary is made of dependent words of the adverbial modifier dependency tag (e.g., immediately, kindly, temporarily, quickly, and the like). Another dictionary is generated associated with if there is an urgency, then what action is being asked to be performed. This dictionary includes head and dependent word pairs of the adverbial modifier dependency tag, where the head must be a verb (e.g., "immediately contact," "kindly click," and the like).

As an example of creation of a Consequence and Threat characteristic dictionary, adverbial clause modifiers (advcl), verbs (VERB), and nouns (NOUN) dependency and POS tagging keywords are used. One dictionary is generated associated with what action the user has to performed to avoid the consequence. This dictionary contains dependent words of the adverbial clause modifier dependency tag (e.g., revalidate, confirm, validate, avoid, and the like). Another dictionary is generated associated with what actions or activity will be affected. This dictionary contains the head word associated with and adverbial clause, where the head is a verb and the adverbial clause is dependent word is a right child of the head word (e.g., "you may not be able to send or receive new mail until you revalidate"). Yet another dictionary is generated associated with what will happen if the user does not perform the action (i.e., the threat). This dictionary contains an adverbial clause modifier's head and dependent word pair, in which both the head and dependent are verbs and the adverbial clause modifier's dependent word is a left child of the head word (e.g., "if you fail to revalidate your mailbox, your mailbox will be deactivated").

The dictionaries are used to collect email features to build the email classifier. These features reflect the percentage of intentions present in the email, rather than just binary information (e.g., whether intentional related words exist in the email or not). This process creates a significantly more robust email classifier.

As discussed above, phishing emails usually include a URL link to a malicious site. Examination of the training datasets for URLs suggests that malicious URLs include features falling into three categories: address bar, domain, and website. Examples of such URL features are provided in Table 2 below.

TABLE 2

| CATEGORY | DESCRIPTION | EXAMPLE |
| --- | --- | --- |
| Address Bar | Use of URL shortening services such as bit.ly and tiny.cc | hxxps://bit.ly/32eMY7h |
| Address Bar | IP address in URL | http://161.53.205.196/sites/default/files/bankofamerica/login.php |
| Address Bar | Long URLs, which hide the suspicious part of the URL (e.g., greater than 75 characters) | http://aceshiprecycling.com/wp-cgi/verify/chase.com/home/myaccount/vbv.php?websrc=e17ea285ad581008aac6b89b49ab879e&dispached=47&id=1613955414 |
| Address Bar | Use of @ in URL | https://bishopgat.xyz/@%23%25$@%23$%25@@/ |
| Address Bar | Location of double slashes | https://href.li/?https://www.danicathreesixty.com |
| Address Bar | Prefix or suffix separator by hyphen to domain | http://www.www-paypal.info/us/cgi-bin/webscrc= login %20run |
| Address Bar | Subdomain and multi-subdomain | http://paypal.co.uk.w97s.top/ |
| Address Bar | https in a URL domain | http://https-security.000webhostapp.com |
| Domain | Domain registration length | Registration of less than a year is indicative of phishing |
| Domain | Domain age | Domain age of less than half a year is indicative of phishing |
| Domain | Alexa ranking | Check whether domain is present in top 1 million Alexa ranking else suspicious |
| Domain | Suspicious domain | Check whether domain is present in phishtank database |
| Domain | Missing DNS record | |
| Website | Excessive number of redirects; Server form handler either empty or refers to a different domain; Website sends information to be filled by the user to an email; Link and anchor tags pointing to different domain; Invalid SSL certificate | |

Embodiments are not limited to the URL classification above. URL classifiers can also include, for example, branding classification and credential validation to determine whether a URL is legitimate or phishing related.

Once the URL and body text machine learning classifiers are trained, they can be used in the process of determining whether incoming messages (e.g., inbound email 305) containing phishing-related content.

Figure 7:
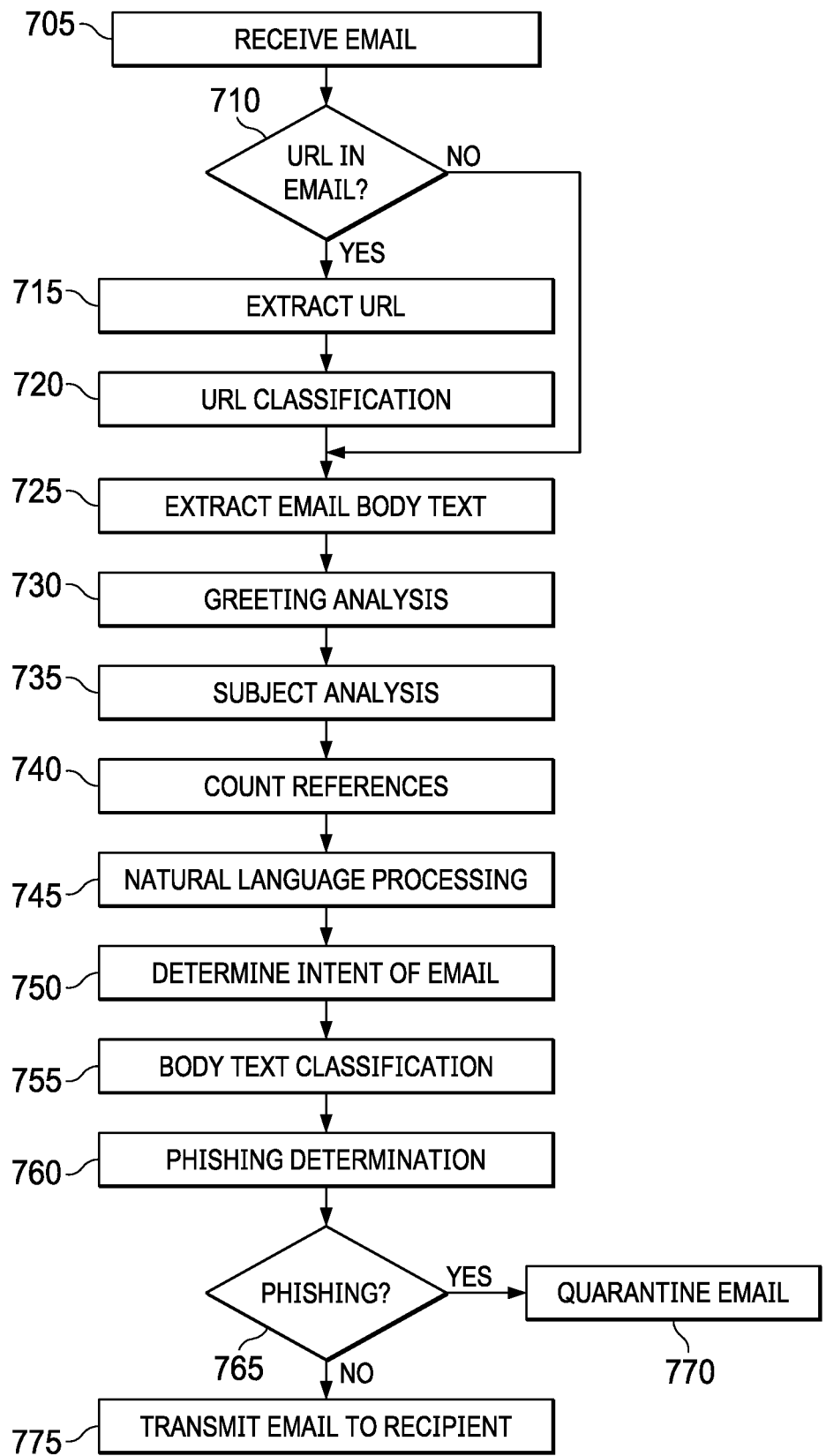
FIG. 7 is a simplified flow diagram illustrating an example of a method 700 for performing phishing classification of an incoming email, in accordance with an embodiment of the present invention.

FIG. 7 is a simplified flow diagram illustrating an example of a method 700 for performing phishing classification of an incoming email, in accordance with an embodiment of the present invention. The method can be performed by, for example, phishing filter 350 in electronic mail system 218 executed by an information processing system. The email is received (705) at the phishing filter, for example, subsequent to having had address parsing (e.g., by address parser 315) and content checking (e.g., by content rules module 335).

An initial check is made to determine whether there is a URL embedded in the email text (710). If there is a URL present, then the URL is extracted from the email message (715) and subjected to URL classification (720), as discussed above. The URL is examined by a machine learning classifier to determine whether the URL features (e.g., Table 2) discovered during training of the classifier are present in the extracted URL. A URL-associated phishing classification is generated. The classification result can be either a legitimate URL (score=0), phishing URL (score=1), or a suspicious URL (score=−1), the quantity of which depends upon the number and types of URL features present in the extracted URL.

As discussed above, phishing classification also involves several analyses of the body text of the email. As part of this process, the body text is extracted from the email (725). A set of analyses are then performed. The greeting of the email is analyzed (730) to determine whether the greeting is general or specific for the recipient. For example, determinations can be made as to whether the recipient's name is missing and whether the greeting is generalized or to an email address rather than an individual's name (e.g., "Greetings," "Dear," "Dear Valued Customer," "My Dear Beneficiary," "Dear Son of God," and "Hi xxx@xyz.com"). The subject of the email can also be analyzed (735) to determine whether there is any similarity between the email subject and the body content (e.g., shared words or phrases). Pronoun references can also be analyzed (740) by counting the number of such pronouns (e.g., you, your, our, and we). Excessive use of these pronoun references may be indicative of a phishing email. Each of these analyses can contribute to a percentage chance that the email is phishing related.

In preparation for the body text to be analyzed for the features discovered during training of the machine learning classifier, natural language processing (745) is performed. The natural language processing is similar to that discussed above with regard to initial natural language processing involved with the training data set. Dependency parsing and part-of-speech tagging are performed to identify features within the body text of the email. Using the processed body text, the intent of the email is determined (750). The intent of the email is assessed using the features discussed above with regard to notifying, urgency, action, consequence, and threat. The assessed intent of the body text contributes to a percentage chance that the email is phishing related.

Each of the body text classification factors (e.g., greeting, subject, references, and intent) are used by the machine learning process to determine a numerical determination that the email body text is associated with phishing (e.g., a probability of phishing=0.9, while non-phishing=0.1) (755). Subsequently, an overall phishing determination is made (760) that combines the body text classification with the URL classification. If the overall phishing determination indicates that the message is likely phishing related (e.g., probability greater than a predetermined threshold) (765), then the email content is quarantined (770) (e.g., by a quarantine module 355). A message can be generated for the intended recipient, indicating that a likely phishing-related message was received for the recipient. If the overall phishing determination indicates that the message is likely not phishing related (765), then the email can be transmitted to the recipient (775) or subjected to other quarantine-associated or filter related tasks (e.g., a spam determination).

In one embodiment, the overall phishing determination (760) is performed by merging the URL classification and body text classification using multiple if-else statements, as with the training and testing process described above. Thus, if both the classifiers predict the email as positive for phishing, then the prediction is phishing (a true positive. If both the classifiers do not match, then the prediction is based upon the probabilities generated by the classifiers. If the probability of being phishing is higher for either classifier than a set threshold (e.g., probability >60%) then the email is labeled as phishing.

Embodiments incorporating the Random Forest machine learning trained classifiers provide a highly accurate detection of phishing emails over traditional methods. Embodiments tested detected between 0.5-2.0% more phishing emails compared to other email detection products. Given the number of emails typically received by a large enterprise network in a day, this can amount to thousands of phishing emails currently being missed and endangering users and their data. Embodiments of the present invention can fill this gap providing a benefit of more secure networks and data.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 2 and 3 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 200 are circuitry located on a single integrated circuit or within a same device. Alternatively, system 200 may include any number of separate integrated circuits or separate devices interconnected with each other. For example, memory 212 may be located on a same integrated circuit as CPU 202 or on a separate integrated circuit or located within another peripheral or slave discretely separate from other elements of system 200. Other subsystems 208 and I/O circuitry 204 may also be located on separate integrated circuits or devices.

Furthermore, those skilled in the art will recognize that boundaries between the functionality of the above-described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 200, for example, from computer readable media such as memory 212 or other media on other computer systems. Such computer readable media may be permanently, removably or remotely coupled to an information processing system such as system 200. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 200 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, while a Random Forest method is discussed with regard to the machine learning classifiers, other types of classifiers can be used without departing from the scope of the present invention. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An information handling system configured as an electronic mail server for an enterprise network, and comprising:
    a processor;
    a network interface, coupled to the processor, and communicatively coupled to the enterprise network;
    a first memory, storing instructions executable by the processor and configured to
        extract a uniform resource locator (URL) address embedded in an electronic mail (email) message received by the network interface,
        determine whether the extracted URL comprises one or more features associated with a phishing URL, the one or more features associated with a phishing URL being pre-determined by training a machine-learning classifier,
        extract body text from the email message,
        determine whether the extracted body text comprises one or more features associated with a phishing email message, the one or more features associated with a phishing URL being pre-determined by training the machine-learning classifier, and
        classify the email message as one of phishing or not phishing using the determinations associated with the extracted URL and the extracted body text.

2. The information handling system of claim 1, wherein the machine-learning classifier comprises a machine-learning URL classifier; and,
    the one or more features associated with a phishing URL are pre-determined by training the machine-learning URL classifier on one or more datasets comprising known phishing URLs and known non-phishing URLs.

3. The information handling system of claim 2, wherein the one or more features associated with a phishing URL comprise one or more of:
use of shortening services on the URL;
an Internet Protocol (IP) address;
a URL of greater than 75 characters;
an "@" symbol within the URL;
multiple sets of double slashes within the URL;
a prefix or suffix separated by a hyphen to a domain of the URL;
one or more subdomains; and
an "https" within the domain of the URL.

4. The information handling system of claim 1, wherein the machine-learning classifier comprises a machine-learning body text classifier, and,
the one or more features associated with a phishing email message are pre-determined by training the machine-learning body text classifier on one or more datasets comprising known phishing emails and known non-phishing emails.

5. The information handling system of claim 4, wherein the one or more features associated with a phishing email message comprise one or more of:
a general greeting;
a lack of richness in vocabulary;
a lack of similarity between a subject of the email and the extracted body text;
excessive use of pronoun references; and
intent of the body text that is indicative of notification, urgency, action, consequence, and threat.

6. The information handling system of claim 1 wherein the processor is configured to determine whether the extracted body text comprises one or more features associated with a phishing email message by being further configured to:
perform natural language processing of the extracted body text to generate dependency and part-of-speech tags associated with sentences within the extracted body text; and
use the tags to determine whether the extracted body text comprises language constructs associated with an intent indicative of notification, urgency, action, consequence, and threat.

7. The information handling system of claim 6 wherein the processor is configured to determine whether the extracted body text comprises the language constructs by being further configured to:
match the tags with language construct information stored in a second memory coupled to the processor in one or more dictionaries, wherein the language construct information stored in the dictionaries is pre-determined during training of a machine-learning body text classifier on one or more datasets comprising known phishing emails and known non-phishing emails.

8. The information handling system of claim 1 wherein the processor is configured to classify the email message as one of phishing or not phishing by being further configured to:
classify the email message as a phishing message when both the extracted URL phishing determination and the extracted body text determination indicate the message is phishing;
classify the email message as a phishing message when one of the extracted URL phishing determination or the extracted body text determination has a probability of being phishing above a set threshold;
classify the email message as not a phishing message when neither of the extracted URL phishing determination or the extracted body text determination has a probability of being phishing above the set threshold.

9. The information handling system of claim 1 wherein the instructions executable by the processor are further configured to
store the email message in a third memory; and
transmit a quarantine message to a recipient of the email message, wherein the quarantine message comprises a notification that the email message has been quarantined, and information associated with the email message.

10. The information handling system of claim 1, wherein the determining whether the extracted URL comprises one or more features associated
with a phishing URL and the determining whether the extracted body text comprises one or more features associated with a phishing email message are both performed by an associated machine learning classifier.

11. A method for identifying phishing email messages, the method comprising:
receiving, at a network interface coupled to an enterprise network, an electronic mail (email) message;
extracting a uniform resource locator (URL) address embedded in the email message;
determining whether the extracted URL comprises one or more features associated with a phishing URL, the one or more features associated with a phishing URL being pre-determined by training a machine-learning classifier;
extracting body text from the email message;
determining whether the extracted body text comprises one or more features associated with a phishing email message, the one or more features associated with a phishing URL being pre-determined by training the machine-learning classifier; and
classifying the email message as one of phishing or not phishing using the determinations associated with the extracted URL and the extracted body text.

12. The method of claim 11 wherein
the machine-learning classifier comprises a machine-learning URL classifier; and,
the one or more features associated with a phishing URL are pre-determined by training the machine-learning URL classifier on one or more datasets comprising known phishing URLs and known non-phishing URLs.

13. The method of claim 12, wherein the one or more features associated with a phishing URL comprise one or more of:
use of shortening services on the URL;
an Internet Protocol (IP) address;
a URL of greater than 75 characters;
an "@" symbol within the URL;
multiple sets of double slashes within the URL;
a prefix or suffix separated by a hyphen to a domain of the URL;
one or more subdomains; and
an "https" within the domain of the URL.

14. The method of claim 11 wherein
the machine-learning classifier comprises a machine-learning body text classifier; and,
the one or more features associated with a phishing email message are pre-determined by training the machine-learning body text classifier on one or more datasets comprising known phishing emails and known non-phishing emails.

15. The method of claim 14, wherein the one or more features associated with a phishing email message comprise one or more of:
   a general greeting;
   a lack of richness in vocabulary;
   a lack of similarity between a subject of the email and the extracted body text;
   excessive use of pronoun references; and
   intent of the body text that is indicative of notification, urgency, action, consequence, and threat.

16. The method of claim 11 wherein said determining whether the extracted body text comprises one or more features associated with a phishing email message further comprises:
   performing natural language processing of the extracted body text to generate dependency and part-of-speech tags associated with sentences within the extracted body text; and
   determining whether the extracted body text comprises language constructs associated with an intent indicative of notification, urgency, action, consequence, and threat, using the tags associated with the sentences.

17. The method of claim 16 wherein said determining whether the extracted body text comprises the language constructs further comprises:
   matching the tags with language construct information stored in a second memory coupled to the processor in one or more dictionaries, wherein the language construct information stored in the dictionaries is pre-determined during training of a machine-learning body text classifier on one or more datasets comprising known phishing emails and known non-phishing emails.

18. The method of claim 11 wherein said classifying the email message as one of phishing or not phishing further comprises:
   classifying the email message as a phishing message when both the extracted URL phishing determination and the extracted body text determination indicate the message is phishing;
   classifying the email message as a phishing message when one of the extracted URL phishing determination or the extracted body text determination has a probability of being phishing above a set threshold;
   classifying the email message as not a phishing message when neither of the extracted URL phishing determination or the extracted body text determination has a probability of being phishing above the set threshold.

19. The method of claim 11 further comprising:
   storing the email message in a third memory; and
   transmitting a quarantine message to a recipient of the email message, using the network interface, wherein the quarantine message comprises a notification that the email message has been quarantined, and information associated with the email message.

20. An information handling system configured to examine communications incoming to an enterprise network for phishing communications, and comprising:
   a processor;
   a network interface, coupled to the processor, and communicatively coupled to the enterprise network;
   a first memory storing instructions executable by the processor and configured to
      extract a uniform resource locator (URL) address embedded in an incoming communication message received by the network interface,
      determine whether the extracted URL comprises one or more features associated with a phishing URL, the one or more features associated with a phishing URL being pre-determined by training a machine-learning classifier,
      extract body text from the incoming communication message,
      determine whether the extracted body text comprises one or more features associated with a phishing communication, the one or more features associated with a phishing URL being pre-determined by training the machine-learning classifier, and
      classify the incoming communication message as one of phishing or not phishing using the determinations associated with the extracted URL and the extracted body text.

* * * * *